United States Patent
Laybourne

(10) Patent No.: US 9,352,462 B2
(45) Date of Patent: May 31, 2016

(54) MULTIPURPOSE FINGER EMBRACING IMPLEMENT

(71) Applicant: Sidney Charles Laybourne, Reno, NV (US)

(72) Inventor: Sidney Charles Laybourne, Reno, NV (US)

( * ) Notice: Subject to any disclaimer, the term of this patent is extended or adjusted under 35 U.S.C. 154(b) by 0 days.

(21) Appl. No.: 14/544,815

(22) Filed: Feb. 20, 2015

(65) Prior Publication Data

US 2015/0258675 A1     Sep. 17, 2015

Related U.S. Application Data

(60) Provisional application No. 61/967,213, filed on Mar. 12, 2014, provisional application No. 61/852,623, filed on Mar. 12, 2013.

(51) Int. Cl.

| | |
|---|---|
| *B43K 23/00* | (2006.01) |
| *B25G 1/10* | (2006.01) |
| *B43K 23/012* | (2006.01) |
| *B43K 7/12* | (2006.01) |
| *B43K 19/02* | (2006.01) |
| *B26B 27/00* | (2006.01) |
| *A46B 17/02* | (2006.01) |
| *G06F 3/0354* | (2013.01) |
| *A46B 5/02* | (2006.01) |

(52) U.S. Cl.
CPC . *B25G 1/102* (2013.01); *A46B 5/02* (2013.01); *A46B 17/02* (2013.01); *B26B 27/007* (2013.01); *B43K 7/12* (2013.01); *B43K 19/02* (2013.01); *B43K 23/012* (2013.01); *G06F 3/03545* (2013.01); *A46B 2200/202* (2013.01); *Y10T 16/476* (2015.01)

(58) Field of Classification Search
CPC ...... B25G 1/102; B26B 27/007; B43K 19/02; B43K 7/12; B43K 23/012; B43K 23/008; A46B 17/02; G06F 3/03545
See application file for complete search history.

(56) References Cited

U.S. PATENT DOCUMENTS

| | | | |
|---|---|---|---|
| D212,981 S | | 12/1968 | Laybourne |
| 4,030,841 A | * | 6/1977 | Balasty .................. B43K 23/00 401/6 |
| 4,127,338 A | * | 11/1978 | Laybourne ........... B43K 23/012 401/8 |
| 4,738,556 A | | 4/1988 | Brown |
| 5,391,010 A | | 2/1995 | Gorbunov |
| 5,885,018 A | | 3/1999 | Sato |
| 6,626,598 B2 | | 9/2003 | Schneider |
| 6,637,962 B1 | | 10/2003 | Roche |
| 6,648,537 B1 | | 11/2003 | Park |
| 6,905,271 B1 | | 6/2005 | Short |
| 6,910,821 B1 | * | 6/2005 | Smith .................. A44C 9/0069 401/8 |
| 2005/0103917 A1 | * | 5/2005 | Kish ....................... A45F 5/004 242/371 |
| 2006/0239761 A1 | * | 10/2006 | Cetera .................... B43K 24/02 401/258 |
| 2007/0196158 A1 | * | 8/2007 | Roche ....................... B26B 5/00 401/7 |
| 2014/0213985 A1 | * | 7/2014 | Teucher .............. A61M 5/2455 604/208 |
| 2015/0079285 A1 | | 3/2015 | Bottjer |

* cited by examiner

*Primary Examiner* — Lun-Yi Lao
*Assistant Examiner* — Ibrahim Khan

(57) ABSTRACT

Herein disclosed is a new and novel multipurpose finger embracing implement of which can be made from any suitable material of engineering choice. The invention includes interchangeable optional features of user choice which allow for numerous uses, such as the implement is functional as a stylus, a pen or pencil, a scalpel or paint brush, etc. Also the implement may include an ink filled cartridge having a ball point which may include a retraction mechanism. More importantly the implement is of a unique ergonomic correct formation and the finger receptacle is completely adjustable for a personalized fit.

9 Claims, 3 Drawing Sheets

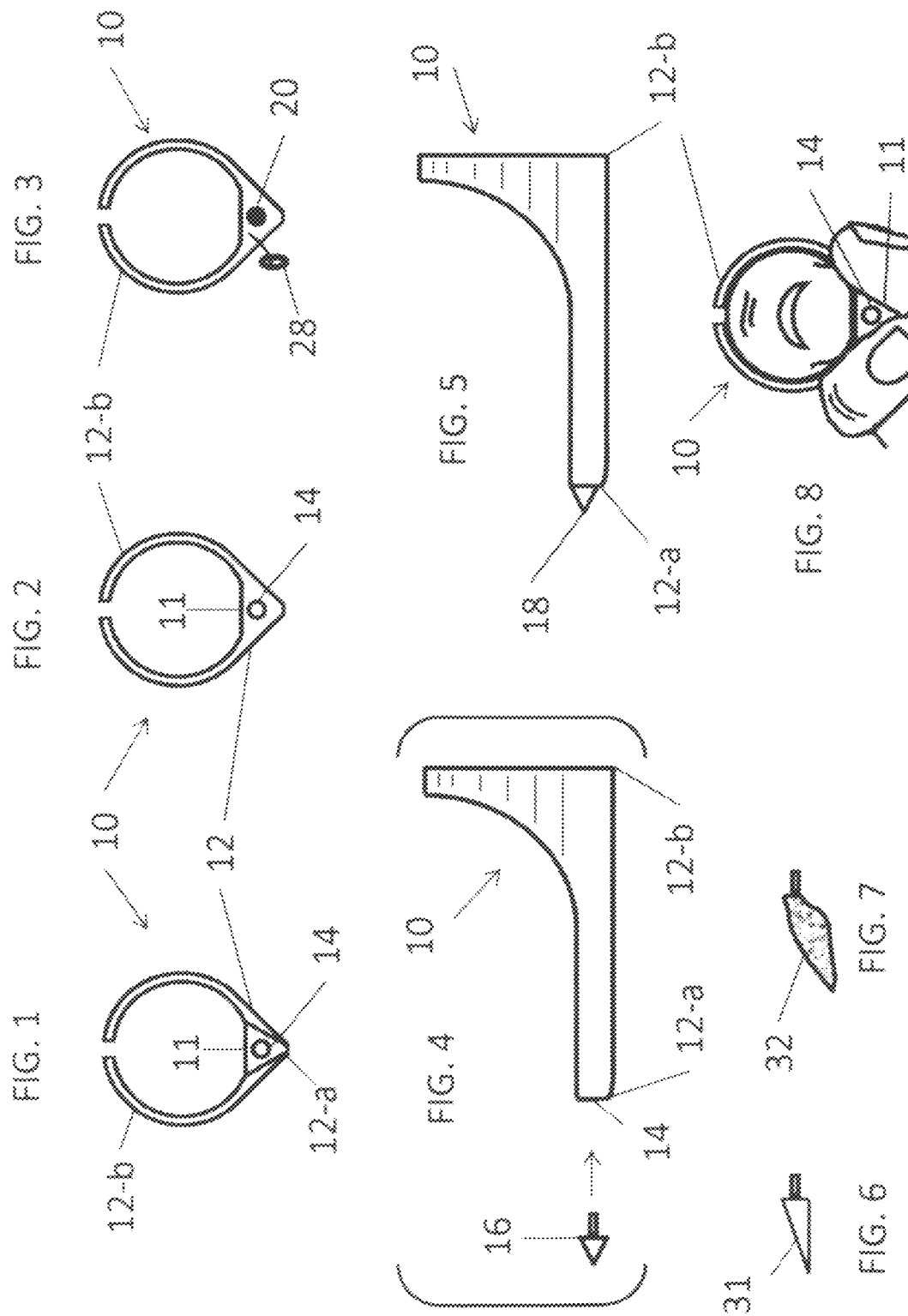

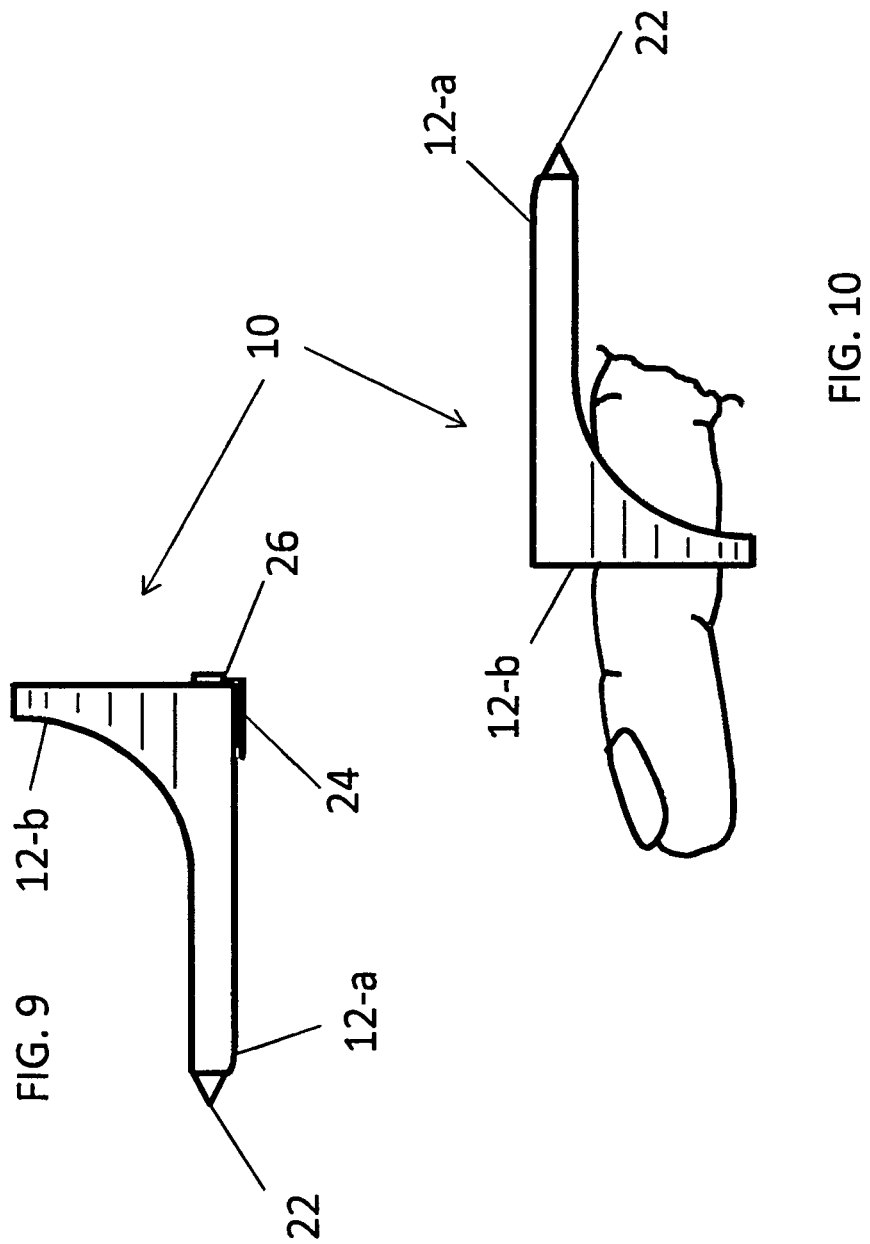

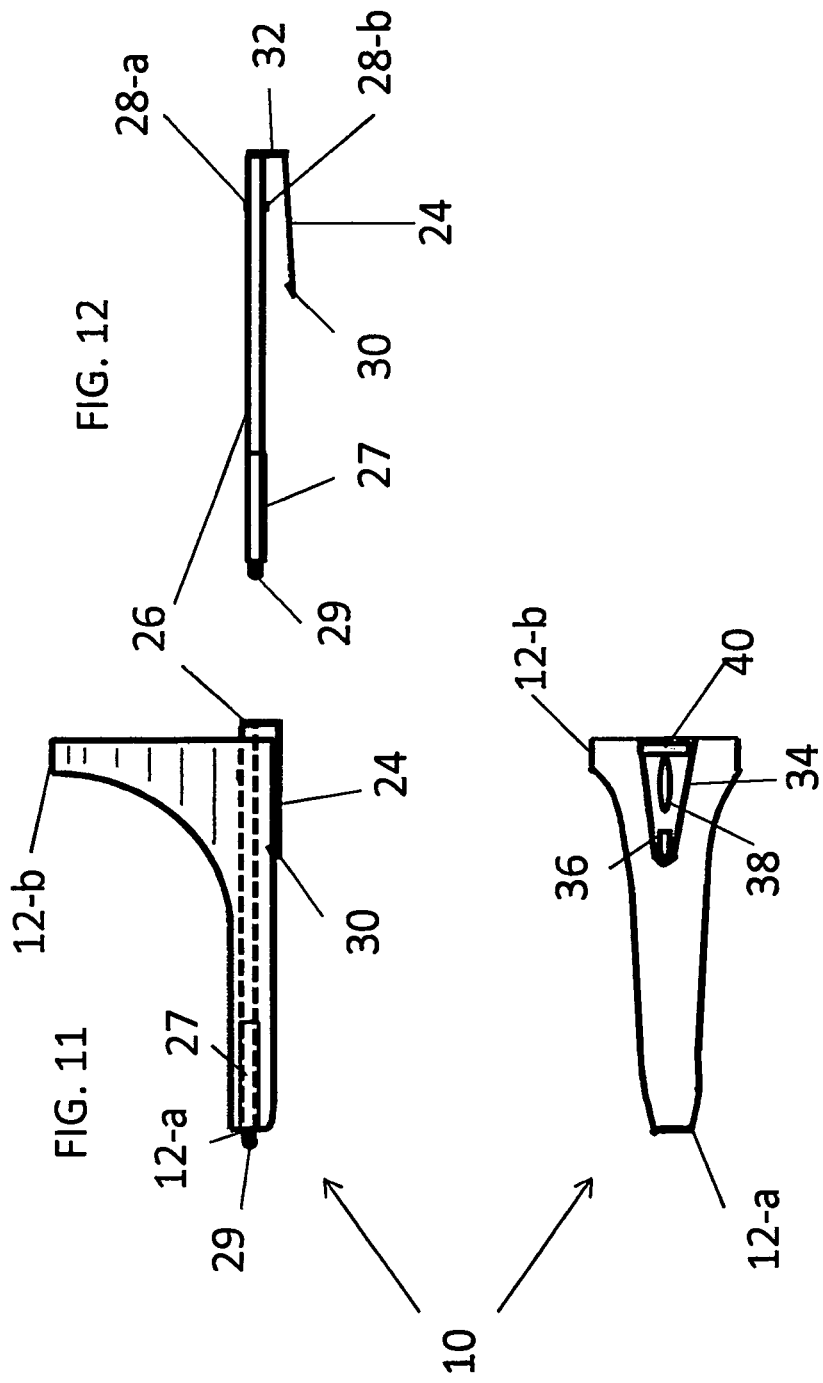

MULTIPURPOSE FINGER EMBRACING IMPLEMENT

CROSS-REFERENCE TO RELATED APPLICATIONS

This Utility Patent Application claims the benefit of Provisional Patent Application Ser. No. 61/852,623 filed on Mar. 18, 2013 entitled "WRITING INSTRUMENTS and Provisional Patent Application Ser. 61/967,213 filed on Mar. 12, 2014 entitled "A MULTIPURPOSE FINGER EMBRACING IMPLEMENT" each in the name of the present inventor and each are hereby incorporated in their entirety.

FIELD OF THE INVENTION

The present invention relates in general to implements that may be used for various tasks of user choice and are removeably slideably adjustably positioned onto a user's fingertip, respectively. More particularly the present invention pertains to an integrally formed body member having a gripping section that is substantially in the shape of an elongated upside triangle. The first end of the body member is multifunctional as it is of a shape and size to receive interchangeable optional features such as a stylus, a writing instrument, a scalpel, a brush, or the like and the second end is functional as a finger receptacle of which is adjustable for a personalized perfect fit. Most importantly due to the novel and unique "triangular" shape the typically known writer's cramp syndrome and/or carpal tunnel syndrome is greatly alleviated and/or completely eliminated.

BACKGROUND OF THE INVENTION

Throughout the centuries numerous types of writing implements have been proposed, the most common of which include pens, pencils, etc. These types of writing implements typically include an elongated, slender and circular body member. During use, particularly if used for long periods of time, the usual cylindrical shaped writing instrument will become quite tiring to the hand, wrist arm and especially the fingers become uncomfortable and actually painful where in contact with ordinary modern day writing instruments. The overall cause of the pain and discomfort is due to the constant and fairly substantial pressures necessary to prevent slipping and sliding of the fingers along the traditional popular generally cylindrical and symmetrically shaped holder designs consistent in all modern day writing instrument holders.

Although the art is replete with instrument structures which have been suggested as solutions for the problems involving pain, fatigue and discomforts leading to medical and other problems, none of the prior proposals have met with any significant commercial success. Most industrial leaders have been directed to specialized shapes or constructions which, even if theoretically alleviating the problem, fail to recognize one very basic and essential factor. Hardly any two individuals hold a writing instrument in exactly the same manner, and most will resist either purchasing or using an item which might require a change in their customary "grip". Thus, while recognized as being a less than ideal compromise, the writing instrument industry has found it impractical to deviate to any significant extent from a generally "cylindrical" gripping surface or section for a writing instrument. The ease of tooling and in manufacturing novel "cylindrical" shape is a term used broadly to include a circular cross section and the usual hexagonal and similar symmetrical cross sections as employed commonly for contemporary writing instrument holders. The industry has continued to concentrate on producing cylindrical shaped writing instruments "none" designed specifically to solve and to eliminate (once and for all) the painful problems associated with common writer's cramp and/or carpal tunnel syndrome such as is now being addressed and presented in this "triangular shaped" adjustable finger embracing writing implement.

Another long standing problem in the writing implement field relates to safe, convenient and efficient storage of the implement between uses. Most often the writing implement is stored within a desk drawer or positioned on top the desk table when not in use, this has proven somewhat satisfactory providing convenient storage for a pen or pencil between uses. However, even where one works at a desk or table, temporary misplacement of a writing implement can become a problem. For example, numerous professions necessitate multitasking such as making entries, taking notes after manipulating various books, shuffling files, papers, drawings, catalogs, etc., of which are most often spread over his or her desk or table. In most such situations the pen or pencil is simply placed on the desk or table while the books or papers are being handled. When the time comes to make a note or entry, the pen or pencil may well be hidden under a paper or drawing, necessitating a time consuming and disrupting shuffling of items in order to locate the instrument.

Other professionals not in an office setting also frequently encounter problems in carrying and using a writing implement. Even if the clothing being worn is provided with pockets, the pockets may be inaccessible under a raincoat or heavy winter jacket, the implement being used may not have a pocket clip or a cap to prevent soiling, or it may be too time consuming to remove and replace the cap or clip every time writing is required. The disposition or storage of a writing instrument represents a real problem for such individuals, particularly if they must manipulate and handle other objects between uses of the instrument. The present invention resolves this issue in a new and novel manner heretofore not taught. To resolve this issue the present implement when not needed for writing, or the like, is easily removed, then reversed and replaced back onto the fingertip in the opposite direction for storage, the user can easily perform and task without any obstruction from the implement.

Within the known prior art numerous attempts have been made in an effort to solve the previously noted problems. However, none of these proposed prior constructions have met with any significant, long term commercial acceptance in spite of the need for an ergonomically friendly, conveniently carried and stored writing implement.

The following Patents are exemplary of the closest related prior art known to the Applicant. U.S. Pats. Des. 418,494, U.S. Pat. Nos. 4,738,556, 6,626,598, 6,648,537, 5,885,018, 6,905,271, 5,391,010 and 6,637,962. Each of which are somewhat functional for their intended use but each have inherent disadvantages and drawbacks which the present invention, recognizes, addresses and resolves in a manner heretofore not taught. Most importantly, none of the cited references recognize the shape of the gripping section is critical for achieving the desired end result and resolving the problems which cause writer's cramp, carpal tunnel syndrome and other painful ailments. Through years of experimentation and research it has become apparent that any type of a writing implement that is formed with a gripping section that is "not" substantially triangular in shape, ultimately results in an uncomfortable, non-functional, pain problematic, undesirable writing implement.

There is one clearly evident ergonomic reason that any shape other than triangular is problematic. Namely, when a person naturally gently positions the thumb, forefinger and middle finger together a space is created there between of which is naturally and normally in the shape of an upside triangle. This is resultant due to the fact that the finger tips, respectively, are substantially circular or oval in shape, not square, hexagonal, rectangular, etc. To further clarify this natural ergonomic formation, it is exemplified when one visualizes three circular or oval shaped objects, with one of the three being positioned centrally on top of the other two, it can clearly be seen that the space created there between is most evidently triangular. It is not possible for any other type of space shaped formation to be created. Therefore, it can certainly be understood that a triangular shaped writing implement conforms naturally to the ergonomically correct position when grasped and held when a user is writing. Also, it is clearly evident that this triangular shaped writing implement eliminates slippage and rolling associated with any other type of shaped implement. Still further due to the triangular shape, the user automatically inadvertently naturally positions the tip of the writing implement in an ergonomically correct comfortable writing position. It is not possible to hold the triangular writing implement in the wrong position.

Therefore, it can now be seen there is a need for a new and novel triangular shaped finger embracing implement that recognizes, addresses and resolves all of the problems associated with all of the known standard, typical finger embracing implements in a manner heretofore not taught.

OBJECTS AND ADVANTAGES OF THE PRESENT INVENTION

It is therefore a primary object of the present invention to provide a multipurpose finger embracing implement that is easy to use, lightweight and fun to use. Most importantly the present writing implement is ergonomically correct so as to greatly reduce and/or completely eliminate fatigue, writer's cramp, carpal tunnel syndrome, etc.

Another important object of the present invention is to provide a multipurpose finger embracing implement that includes an adjustable personalized fit finger receptacle. This is accomplished due to the size, shape and material of manufacture. In the preferred embodiment, the implement is manufactured from a medium-density Polypropylene plastic, or the like, or any other material of engineering choice that is resilient, unlikely to crack, break or become deformed. The result is a finger receptacle that is pliable, flexible, is variable in shape and size and substantially easily molds into a most comfortable personalized fit. In use, the user can ideally reshape the finger receptacle and make it into their own size. Thereafter, the finger receptacle retains the desired shape. The finger receptacle can be conformed into a smaller shape than when originally formed and/or it can be reformed into the original shape. Thus, the finger receptacle can be adjusted to comfortably fit anyone, from a small child to a large adult and those in between.

Another important object of the present invention is to provide a multipurpose finger embracing implement that can be used as a stylus, pencil, pen, brush, scalpel or the like, depending on the needs and/or desires of the user.

Still a further object of the present invention is to provide a multipurpose finger embracing implement that includes optional features of engineering choice, such as an attachment clip and/or a retraction mechanism, etc.

Yet another important object of the present invention is to provide a multipurpose finger embracing implement that allows a user to re-position the implement on their fingertip from a writing position into a storage position.

Other objects and advantages will become apparent when taken into consideration with the following specification and drawings.

BRIEF DESCRIPTION OF THE DRAWINGS

FIG. 1 is substantially a "first end" front view depicting the preferred embodiment for the present invention.

FIG. 2 is substantially a "second end" rear view of FIG. 1.

FIG. 3 is substantially a "second end" rear view of FIG. 1 but further including an ink cartridge and a hingedly attached plug.

FIG. 4 is substantially a right side view of the embodiment of FIG. 1 depicting an optional detachable cone shaped pointer.

FIG. 5 is substantially a right side view of the embodiment of FIG. 3.

FIG. 6 is substantially a right side view of an optional scalpel.

FIG. 7 is substantially a right side view of an optional brush.

FIG. 8 is substantially a frontal plan view depicting a user's fingers when the present invention is grasped and held in an ergonomically correct position.

FIG. 9 is substantially a right side view of the present invention having a retraction mechanism and a clip.

FIG. 10 is substantially a plan view depicting the present invention when positioned onto a user's finger for storage purposes when not in use.

FIG. 11 is substantially a right side view of the present invention having a retraction mechanism (shown in ghost lines) and a clip.

FIG. 12 is substantially a right side view of the retraction mechanism.

FIG. 13 is substantially a bottom view of FIG. 11.

DETAILED DESCRIPTION OF THE DRAWINGS

Referring now in detail to the drawings wherein like characters refer to like elements throughout the various views.

Throughout the various views (10) is an overview of the preferred embodiment for the multipurpose finger embracing implement of the present invention. The multipurpose finger embracing implement is substantially formed in combination from an integrally made body member (12) shaped in the form of an elongated upside down triangle (11) providing an elongated flat top side, an elongated downwardly inwardly tapered right side, and an elongated downwardly inwardly tapered left side of which in combination providing an ergonomically correct finger gripping section when grasped by a user as depicted in FIG. 8, respectively.

The integrally made body member (12) having a first end (12-a), a second end (12-b) which is formed into a finger receptacle, and an internal open ended circular aperture (14) there through. It is to be clearly understood that the integrally made body member (12) can be easily utilized for substantially any use requiring an ergonomically correct finger embracing implement. For exemplary purposes the following description addresses some possible uses but the invention is not to be limited as numerous possibilities are inherent.

As illustrated in FIG. 4 the multipurpose finger embracing implement (10) further includes a detachable cone shaped pointer (16) of which is of a shape and size to be slideably inserted and frictionally retained within the internal open ended circular aperture (14), whereby, the finger embracing implement (10) is functional as a stylus. The stylus can manufactured from any material of engineering choice such as conductive plastic or the like and is functional for use as any type of stylus such as might be used with an iPhone, iPad and other sensitive devices having a touch screen.

Stylus points vary from hard face points to softer points to soft and hard rubberized points manufactured from varied appropriate conductive materials. Any or all points may be slideably positioned into the first end (12-a) of the internal open ended circular aperture (14). Furthermore each of the stylus points are of a shape and size to be secured in position so as to restrict any rearward advancement into the internal open ended circular aperture (14).

As illustrated in FIG. 5, the multipurpose finger embracing implement (10) may include a pencil (18) and the internal open ended circular aperture (14) is of a shape and size to slideably receive and fictionally retain the pencil (18) therein, whereby, the finger embracing implement (10) is functional as a writing instrument in the form of a pencil.

As illustrated in FIGS. 3 and 9, the multipurpose finger embracing implement (10) further includes an ink filled cartridge (20) having a ballpoint tip (22), see FIG. 9. The internal open ended circular aperture (14) is of a shape and size to slideably receive and fictionally retain the ink filled cartridge (20) therein and the ballpoint tip (22) protrudes outwardly from the first end (12-a), whereby, the finger embracing implement (10) is functional as a writing instrument in the form of a ballpoint pen.

It is to be noted as an option of engineering choice, the ball point tip (22) may be permanently installed into the first end (10-a) of the finger embracing implement (10) with ink or writing fluids squirted into the second end to optionally replace the usual standard ink cartridge refill.

As further illustrated in FIG. 9, the above noted ink filled cartridge (20) may further include a clip (24) integrally formed therewith. Thus, the user may use the clip (24) for attaching the finger embracing implement (10) onto their shirt pocket or the like. Also illustrated in FIG. 9, the multipurpose finger embracing implement (10) may further include a spring loaded retraction mechanism (26) for retracting the ballpoint tip (22) of the ink filled cartridge (20). Thus, the first end (12-a) of the finger embracing implement (10) is functional as a stylus when the ballpoint tip (22) is retracted. Also, when the finger embracing implement (10) is not in use the user may utilize the spring loaded retraction mechanism (26) if so desired.

As illustrated in FIG. 3, another optional feature for the multipurpose finger embracing implement (10) may include upon the second end (12-b) a hingedly attached plug (28) which is of a shape and size to be slideably removeably frictionally retained within said internal open ended circular aperture.

As illustrated in FIG. 6, the multipurpose finger embracing implement (10) may further include upon the first end (12-a) an optional detachable scalpel (31) of which is of a shape and size to be frictionally slideably retained within internal open ended circular aperture (14), whereby, the finger embracing implement (10) is functional as a slicing and cutting instrument. It is to be noted because of the stability of the multipurpose finger embracing implement (10) it provides a user absolute cutting/slicing control preventing up and down and left and right slipping and sliding readjustments while a user undertakes any number of precise cuts.

As illustrated in FIG. 7, the multipurpose finger embracing implement (10) may further include upon the first end (12-a) an optional detachable brush (32) of which is of a shape and size to be frictionally slideably retained within internal open ended circular aperture (14), whereby, the finger embracing implement (10) is functional as a painting instrument.

As illustrated in FIG. 10, the multipurpose finger embracing implement (10) is shown in a storage position. Whereby, the user simply re-positions the multipurpose finger embracing implement (10) upside down and reversed with the first end (12-a) pointing in the direction opposite the finger tip. This is most advantageous as it allows the user complete mobility and is not obstructive to movement in any manner, yet the implement is conveniently available for use when needed.

Referring now to FIG. 11, wherein as illustrated the spring loaded retraction mechanism (26) (shown in ghost lines) is in a non-retracted position. Whereby, it can be seen that when the retraction mechanism is in the non-retracted position, the attachment clip (24) rests in substantially flush manner up against the bottom surface of the multipurpose finger embracing implement (10). Therefore the attachment clip (24) will not interfere with the user's fingers and/or proper grasp while writing or the like. The spring loaded retraction mechanism (26) is more clearly defined in FIG. 12. Wherein as illustrated the spring loaded retraction mechanism (26) further includes slightly outwardly protruding pegs (28-a) and (28-b) and the attachment clip (24) includes an upraised protrusion (30). Importantly the spring loaded retraction mechanism (26) and the attachment clip (24) are integrally molded to form a flexible hinge (32). Also, the spring loaded retraction mechanism includes an ink cartridge (27) and a ball point (29). In reference to FIG. 13, the multipurpose finger embracing implement (10) further includes a slighted indented recess (34) having therein a first aperture (36), a second aperture (38) and a slightly upraised stop element (40). The first and second apertures (36 & 38) are in open communication with the internal open ended circular aperture (14). Whereby, when the spring loaded retraction mechanism (26) is slideably inserted into the internal open ended circular aperture (14), simultaneously the ball point (29) protrudes outwardly from within the internal open ended circular aperture (14), the upraised protrusion (30) snaps into the first aperture (36), the outwardly protruding peg (28-a) slides forwardly into the internal open ended circular aperture (14) and the outwardly protruding peg (28-b) slides forwardly into the second aperture (38). Thus, when the spring loaded retraction mechanism (26) is fully engaged assuming the non-retracted position, the multipurpose finger embracing implement (10) is fully functional as a writing pen. It is to be understood that when the spring loaded retraction mechanism (26) is fully engaged assuming the non-retracted position, the spring loaded retraction mechanism (26) is secured in a fixed manner when the upraised protrusion (30) is fully snapped into position within the first aperture (36).

When the user wishes to retract the spring loaded retraction mechanism (26) into the retracted position, they simply position their thumb (or any finger or object of user choice) on the underside surface of the flexible hinge (32) and apply slight gentle upward pressure. Therefore, resulting in flexion of the flexible hinge (32) of which automatically retracts the ball point (29) and the upraised protrusion (30) retracts downwardly from within the first aperture (36). This action further causing each of the outwardly protruding pegs (28-a) and (28-b) to be slideably repositioned in a rearward direction within the second aperture (38) until each of the outwardly protruding pegs (28-a) and (28-b) make contact with the slightly upraised stop element (40). Whereby, each of the outwardly protruding pegs (28-a) and (28-b) and the slightly upraised stop element (40) in combination retain the spring loaded retraction mechanism (26) in a secure manner within internal open ended circular aperture (14) of the multipurpose finger embracing implement (10). It can now be understood when the spring loaded retraction mechanism (26) is retracted the user if so desired can utilize the attachment clip (24) for attaching the multipurpose finger embracing implement (10) onto an object of choice, such as a shirt pocket or the like.

Furthermore, if replacement of the spring loaded retraction mechanism (26) is required this is easily accomplished by the user grasping the flexible hinge (32) and gently pulling outwardly which forces each of the outwardly protruding pegs (28-a) and (28-b) to slide over and out of contact with the slightly upraised stop element (40) thus allowing removal of the spring loaded retraction mechanism (26).

It can now be seen herein disclosed is a new and novel multipurpose finger embracing implement of which can be made from any suitable material of engineering choice. The invention includes interchangeable optional features of user choice which allow for numerous uses, such as the implement is functional as a stylus, a pen or pencil, a scalpel or paint brush, etc. Also the implement may include an ink filled cartridge having a ball point which may include a retraction mechanism. More importantly the implement is of a unique ergonomic correct formation and the finger receptacle is completely adjustable for a personalized fit.

Although the invention has been herein shown and described in what is conceived to be the most practical and preferred embodiment, it is recognized that departures may be made there from within the scope and spirit of the invention, which is not to be limited to the details disclosed herein but is to be accorded the full scope of the claims so as to embrace any and all equivalent devices and apparatuses.

Having described the invention, what I claim as new and desire to secure by Letters Patent is:

1. A multipurpose finger embracing implement in combination comprising: an integrally made body member shaped in the form of an elongated upside down triangle having a first end; a second end; an elongated flat top side; an elongated downwardly inwardly tapered right side; an elongated downwardly inwardly tapered left side; and an internal open ended circular aperture there through; said first end being conically shaped, said second end being non-conically shaped resulting in said elongated upside down triangle being tapered lengthwise from said second end to said first end, said elongated flat top side with said elongated downwardly inwardly tapered right side and said elongated downwardly inwardly tapered left side in combination providing an ergonomically correct finger gripping section and said second end being formed into a finger receptacle;

wherein said internal open ended circular aperture is of a shape and size therein to slideably receive and frictionally retain an ink filled cartridge having a ballpoint tip, whereby, said finger embracing implement is functional as a writing instrument;

a spring loaded retraction mechanism comprising: said ink filled cartridge being integrally formed with an attachment clip, said ink filled cartridge with said attachment clip form a flexible hinge, said ink filled cartridge further includes slightly outwardly protruding pegs, said attachment clip includes an upraised protrusion, said multipurpose finger embracing implement further includes a slighted slightly indented recess having therein a first aperture, a second aperture, and a slightly upraised stop element, said first and said second apertures are in open communication with said internal open ended circular aperture, whereby;

when said spring loaded retraction mechanism is slideably inserted into said internal open ended circular aperture, simultaneously said ball point protrudes outwardly from within said internal open ended circular aperture, said upraised protrusion snaps into said first aperture, said outwardly protruding peg slides forwardly into said internal open ended circular aperture and said outwardly protruding peg slides forwardly into said second aperture assuming the non-retracted position, whereby;

the retraction mechanism is retracted into a retracted position when a when the user wishes to retract said spring loaded retraction mechanism into a retracted position, user simply positions their thumb, finger or object on the underside surface of said flexible hinge and applies slight gentle upward pressure, resulting in flexion of said flexible hinge, which automatically retracts said ball point, said upraised protrusion retracts downwardly from within said first aperture, this action further causing each of the said outwardly protruding pegs to be slideably repositioned in a rearward direction within said second aperture until each of the said protruding pegs make contact with said slightly upraised stop element, whereby;

each of the said outwardly protruding pegs and said slightly upraised stop element in combination retain said spring loaded retraction mechanism in a secure manner within said internal open ended circular aperture of said multipurpose finger embracing implement.

2. The multipurpose finger embracing implement of claim 1 wherein said first end further includes a detachable cone shaped pointer having an elongated protruding leg of which is of a shape and size to be frictionally slideably retained within said internal open ended circular aperture, whereby, said finger embracing implement is functional as a stylus.

3. The multipurpose finger embracing implement of claim 1 wherein said first end further includes a detachable scalpel having an elongated protruding leg of which is of a shape and size to be frictionally slideably retained within said internal open ended circular aperture, whereby, said finger embracing implement is functional as a slicing and cutting instrument.

4. The multipurpose finger embracing implement of claim 1 wherein said first end further includes a detachable brush having an elongated protruding leg of which is of a shape and size to be frictionally slideably retained within said internal open ended circular aperture, whereby, said finger embracing implement is functional as a painting instrument.

5. The multipurpose finger embracing implement of claim 1 wherein said internal open ended circular aperture is of a shape and size to slideably receive and fictionally retain a pencil therein, whereby, said finger embracing implement is functional as a writing instrument.

6. The multipurpose finger embracing implement of claim 1 wherein said second end further includes a hingedly attached plug which is of a shape and size to be slideably removeably frictionally retained within said internal open ended circular aperture and said hingedly attached plug having a small aperture there through for ventilation which improves ink flow.

7. The multipurpose finger embracing implement of claim 1 wherein said finger receptacle is adjustable for a personalized fit.

8. The multipurpose finger embracing implement of claim 1 is manufactured from a medium-density Polypropylene plastic.

9. The multipurpose finger embracing implement of claim 1 includes a storage position when not in use.

* * * * *